(12) United States Patent
Matsumoto et al.

(10) Patent No.: US 6,308,807 B1
(45) Date of Patent: *Oct. 30, 2001

(54) DISK BRAKE

(75) Inventors: Atsuo Matsumoto; Yoshiki Matsuzaki, both of Itami (JP)

(73) Assignee: Sumitomo Electric Industrial, Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/038,114

(22) Filed: Mar. 11, 1998

(30) Foreign Application Priority Data

Mar. 12, 1997 (JP) .................................................. 9-057297

(51) Int. Cl.[7] .............................. F16D 65/54; F16D 65/097
(52) U.S. Cl. ..................... 188/72.4; 188/71.8; 188/73.38; 188/167; 188/83; 303/1
(58) Field of Search ............................... 188/72.4, 72.5, 188/83, 73.37, 73.38, 73.36, 73.35, 250 E, 218 A, 216, 217, 264 G, 234, 166, 167, 71.1, 71.8, 71.9, 196 R, 346, 370, 201, 170, 265, 353, 196 P, 196 A, 24.22, 72.3; 303/89, 1

(56) References Cited

U.S. PATENT DOCUMENTS

| | | | |
|---|---|---|---|
| 3,473,631 | * | 10/1969 | Schmid . |
| 3,517,784 | * | 6/1970 | Clemmons ........................ 188/196 A |
| 3,837,443 | * | 9/1974 | Clemmons et al. . |
| 3,986,584 | * | 10/1976 | Wright et al. ........................ 188/71.8 |
| 4,230,208 | * | 10/1980 | Gale . |
| 4,315,563 | * | 2/1982 | Hayashi et al. ................... 188/73.38 |
| 4,364,610 | * | 12/1982 | Williams . |
| 4,498,711 | * | 2/1985 | Langley et al. . |
| 4,995,482 | | 2/1991 | Kobayashi et al. . |
| 5,706,917 | | 1/1998 | Matsuzaki . |

FOREIGN PATENT DOCUMENTS

| | | |
|---|---|---|
| 0140549 | 5/1985 | (EP) . |
| 0747608 | 12/1996 | (EP) . |
| 0864772 | * 9/1998 | (EP) . |
| 2237856 | 5/1991 | (GB) . |
| 6-74261 | 3/1994 | (JP) . |
| 9-196092 | 7/1997 | (JP) . |
| 10252788 | * 9/1998 | (JP) . |

OTHER PUBLICATIONS

Copy of an English Language Abstract of JP No. 6–74261.
Copy of an English Language Abstract of JP No. 9–196092.

* cited by examiner

Primary Examiner—Douglas C. Butler
(74) Attorney, Agent, or Firm—Greenblum & Bernstein, P.L.C.

(57) ABSTRACT

A disk brake having members for keeping the friction pads in contact with the disk rotor in such a way that the wear of the friction members and the energy loss are kept to a minimum. The disk brake has a disk rotor, friction pads provided opposed to each other on both sides of the disk rotor, a caliper formed with a fluid pressure cylinder at least on one side of the disk rotor, and a piston slidably received in the cylinder for selectively applying braking force to the disk rotor by pushing the friction pads into sliding contact with the disk rotor. A resilient member is disposed between the piston and one of the friction pads provided opposite the piston for biasing the friction pads toward the disk rotor by a predetermined stroke, thereby keeping the friction pads in contact with the disk rotor at a predetermined surface pressure even while the brake is not applied.

11 Claims, 7 Drawing Sheets

Abrasion test for disk rotor
(abrasion on single side
after driving at 130 Km/hour for 20 hours)

DISK BRAKE

BACKGROUND OF THE INVENTION

The present invention relates to a disk brake having a disk rotor and friction pads adapted to be kept in contact with the disk rotor even while the brake is not applied so as to keep off earth, sand or muddy water that may stick to the disk rotor while the vehicle is traveling on an unpaved road and to keep applying a light, stable dragging torque to the disk rotor, thus preventing uneven wear of the disk rotor while the vehicle is traveling on a paved road.

In order to keep off earth, sand or muddy water stuck on the disk rotor of a disk brake while the vehicle is traveling on an unpaved road, some conventional disk brakes have a separate scraper provided near the caliper body. Other conventional disk brakes have their friction pads made from a sintered metal that is insensitive to water fade. The former arrangement is uneconomical because it needs, besides the separate scraper, an adjustor means that follows the wear of the scraper. In the latter arrangement, although water fade lessens, the friction pads made of sintered metal tend to severely attack the disk rotor. Also, their friction coefficient tends to fluctuate according to use conditions. Moreover, it is necessary to increase the vibration-proofness of peripheral parts because the friction pads are heavy.

The disc rotor may be worn unevenly, attacked by friction pads due to run-out of the disk rotor. That is, the run-out of the disk rotor causes the disk rotor to be periodically brought into contact with the friction pads in each revolution of the disk rotor. The disk rotor is thus worn unevenly or locally, developing thin portions circumferentially alternating with thick portions. When the pads are pressed against such an unevenly worn disk rotor to brake the disk while the vehicle is traveling at medium to high speeds, the fluid pressure in the cylinders fluctuates at short intervals. This causes the brake pedal and the steering wheel to judder.

One way to prevent such a judder is to minimize run-out of the disk rotor. Another way is to secure a gap between the disk rotor and the friction pads without impairing the piston retraction function. Such a means is disclosed in Japanese patent publication 9-53668 filed by the applicant of this invention. Specifically, the disk brake disclosed in this application has a shim in the shape of a flat plate disposed between the friction pads and the pistons. The shim couples the friction pads to the pistons. Thus, when the pistons retract, the friction pads also retract together with the pistons out of contact with the disk rotor.

Automobiles travel on various kinds of grounds. RV's may travel not only on paved roads but on muddy or marshy grounds. The disk rotor of a disk brake is exposed to the air, so that it tends to be affected by the environmental changes. For example, earth, sand or muddy water may invade into the gaps between the disk rotor and the friction pads while the vehicle is traveling on an unpaved road, causing fluctuation in the friction coefficient or abnormal wear of sliding parts. It is therefore important to keep the surface of the disk rotor in a stable state.

One way for this aim is to use the friction pads themselves as scrapers for scraping off any foreign matter stuck on the rotor surface. For this purpose, it is important to select such a material for the sliding members and attain such sliding conditions that the wear of the friction members and the energy loss are kept to a minimum.

An object of the present invention is to provide a disk brake having the friction pads kept in contact with the disk rotor to avoid the entry of sand and muddy water and which functions satisfactorily even if they are kept in contact with each other.

SUMMARY OF THE INVENTION

According to the present invention, there is provided a disk brake comprising a disk rotor, friction pads provided opposed to each other on both sides of said disk rotor and having a back plate, a caliper formed with a fluid pressure cylinder on at least one side of the disk rotor, a piston slidably received in the cylinder for applying braking force to the disk rotor by pushing the friction pads into frictional contact with the disk rotor, a piston retractor means for retracting the piston when fluid pressure applied to the piston is released, and a resilient member disposed between the piston and the friction pads for biasing the friction pads toward the disk rotor by a predetermined stroke, thereby keeping the friction pads in contact with the disk rotor at a predetermined surface pressure even while the brake is not applied.

The resilient member may be a shim in the shape of a flat plate having tongues formed by cutting and raising portions of the shim, the shim having claws straddling the back plate of the friction pad. The claws determine the stroke of the tongue. In this arrangement, it is possible to attain the properties of the resilient member and the setting of its stroke simply by changing the design of the shim.

The resilient member may be a coil spring having one end thereof engaged in a concave bottom of the piston and the other end fitted in a deep-drawn cap slidably inserted in the piston. The stroke of the coil spring is determined by the position of a snap ring received in a groove formed in the inner periphery of the piston and the position of a shoulder portion formed on the outer periphery of the cap. This arrangement improves the durability of the resilient member and ease of mounting.

The resilient member may be a member having a leaf spring. The stroke of the leaf spring is determined by engaging anchors formed by cutting and raising portions of a shim in the shape of a flat plate disposed between the piston and the friction pad, the anchors being engaged in a piston boot groove formed in the piston. This type of resilient member has an increased durability.

Other features and objects of the present invention will become apparent from the following description made with reference to the accompanying drawings, in which:

DETAILED DESCRIPTION OF THE PREFERRED EMBODIMENT

Figure 1:
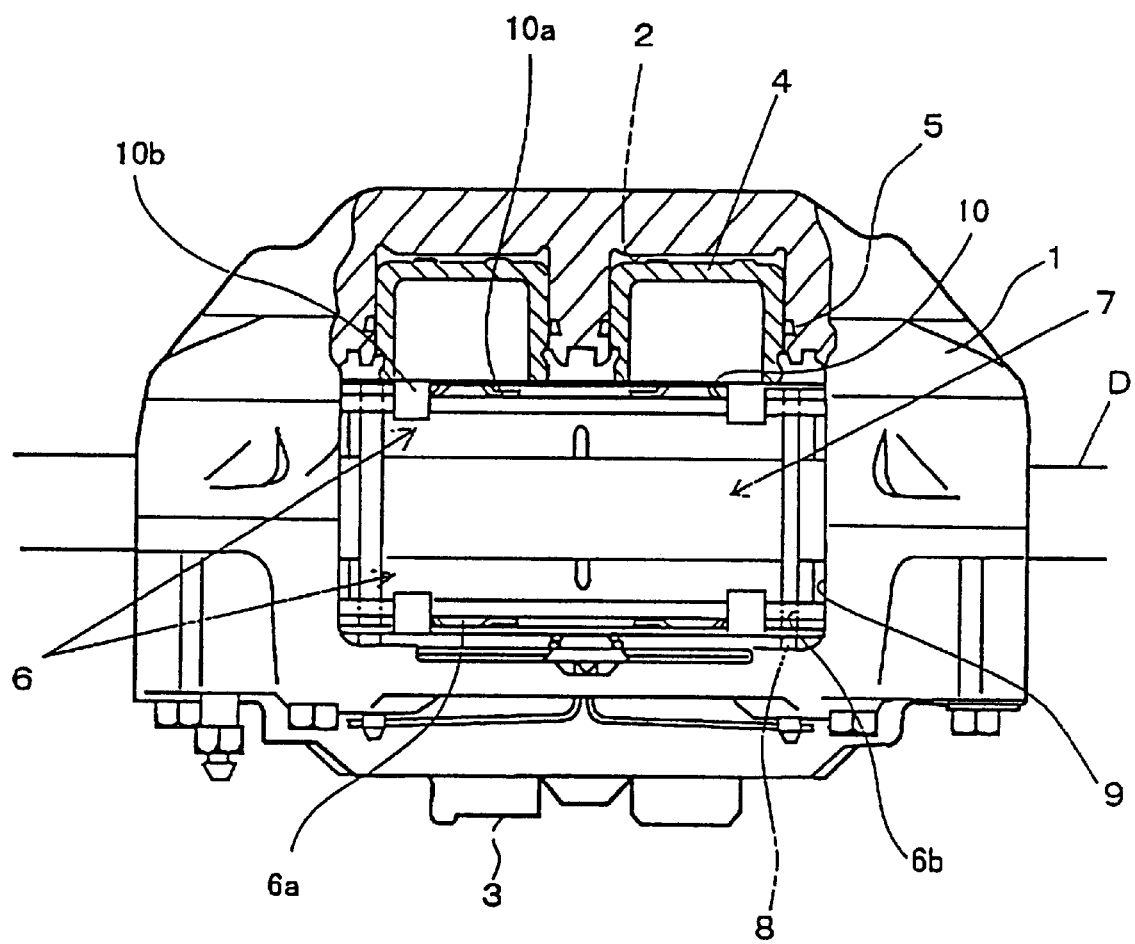
FIG. 1 is a plan view of an opposed type disk brake according to the present invention.

The disk brakes shown are an opposed type which is one type of disk brakes. FIG. 1 is a plan view of one of such disk brakes embodying the present invention. This disk brake includes a caliper 1 formed with hydraulic cylinders 2 arranged opposite to the disk rotor D and communicating with a fluid inlet 3, and pistons 4 slidably received in the respective cylinders 2. Fluid pressure introduced through the fluid inlet 3 is applied through passages (not shown) leading to the respective cylinders 2 to the back of the pistons 4. The outer periphery of each piston 4 is liquid-tightly sealed by a piston seal 5 having a piston retracting function.

Pad pins 8 extending across a window 7 formed in the caliper 1 extend loosely through holes 6b formed in back plates 6a of friction pads 6 provided opposite to each other on both sides of the disk rotor D to support the friction pads 6 so as to be slidable in the axial direction of the disk rotor D. The friction pads 6 are adapted to be urged into frictional contact with the disk rotor D under fluid pressure applied to the back of the pistons 4. When the friction pads 6 are brought into frictional contact with the disk rotor D, braking torque is applied to the pads 6. This braking torque is borne by torque bearing portions 9 of the caliper 1. Thus, braking force is applied to the members which rotate with the disk rotor, such as a wheel.

Figure 2:
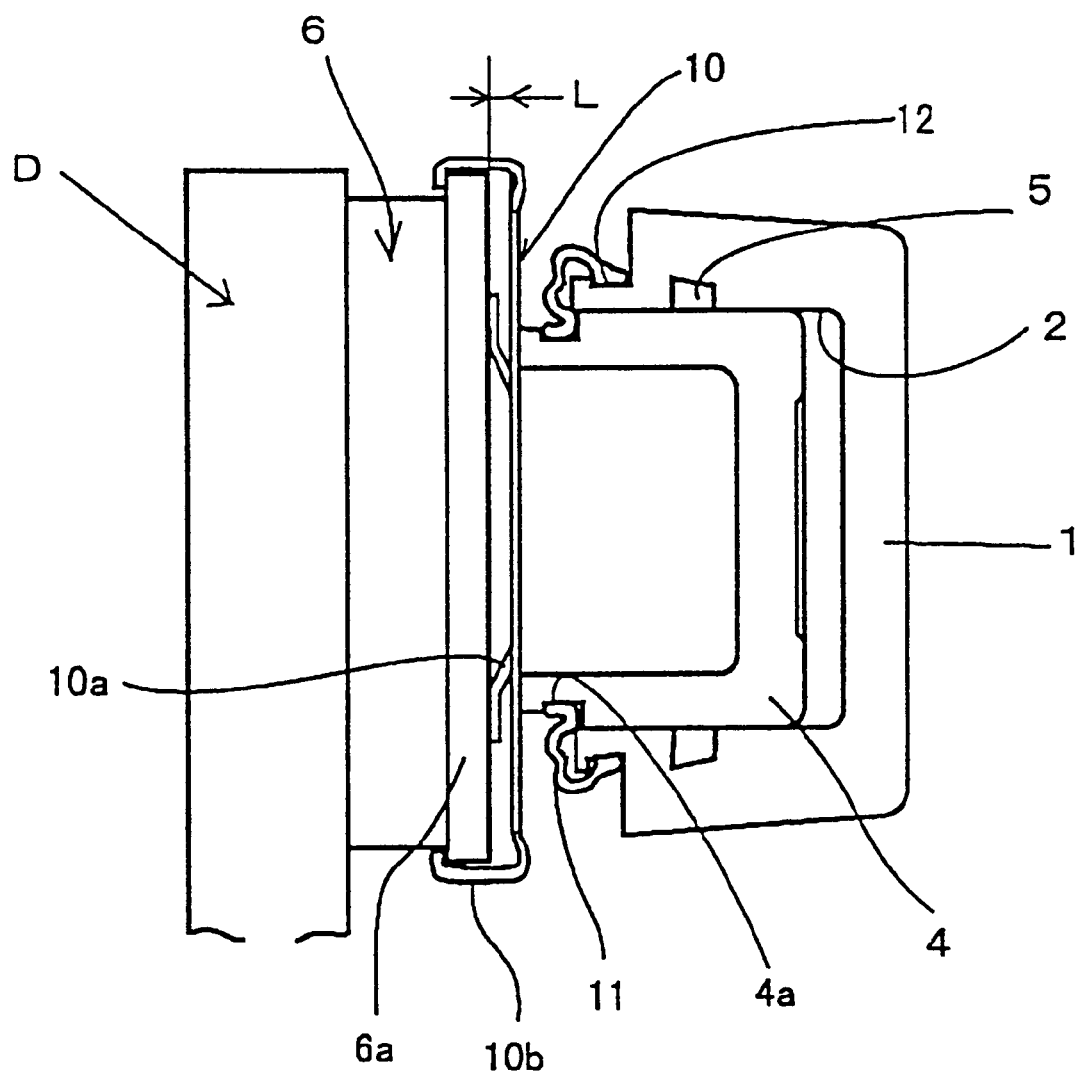
FIG. 2 is a sectional view of a resilient member of the first Embodiment according to the present invention.

According to the present invention, the friction pads 6 are kept in frictional contact with the disk rotor D at a predetermined surface pressure even while the brake is not applied. For this purpose, as shown in FIG. 2, a shim 10 is provided between each friction pad 6 and the pistons 4. The shim 10 has a plurality of integral tongues 10a pressing against the back plate 6a of the pad 6 and the end faces of the pistons 4 to resiliently bias the pad 6 and the pistons 4 away from each other. The shim 10 also has claws 10b straddling the back plate 6a to set a stroke L of the claws 10b.

The stroke L is determined based on the maximum run-out of the disk rotor. For example, the disk rotor D of a disk brake mounted on a typical RV car has an effective braking radius r (distance from the axle center to the center of each piston of the disk brake) of about 130 mm. According to the service manual of such an RV car, the run-out of the disk is not more than 0.05 mm within the effective braking radius. Besides such normal-temperature run-out, the disk rotor may also run out up to 0.15 mm due to thermal deformation during braking because the kinetic energy produced during braking is converted to thermal energy, so that the disk can be heated to about 300° C. Thus, in such a case, the stroke L should be set at about 0.2 mm (0.05+0.15 mm).

Figure 6:
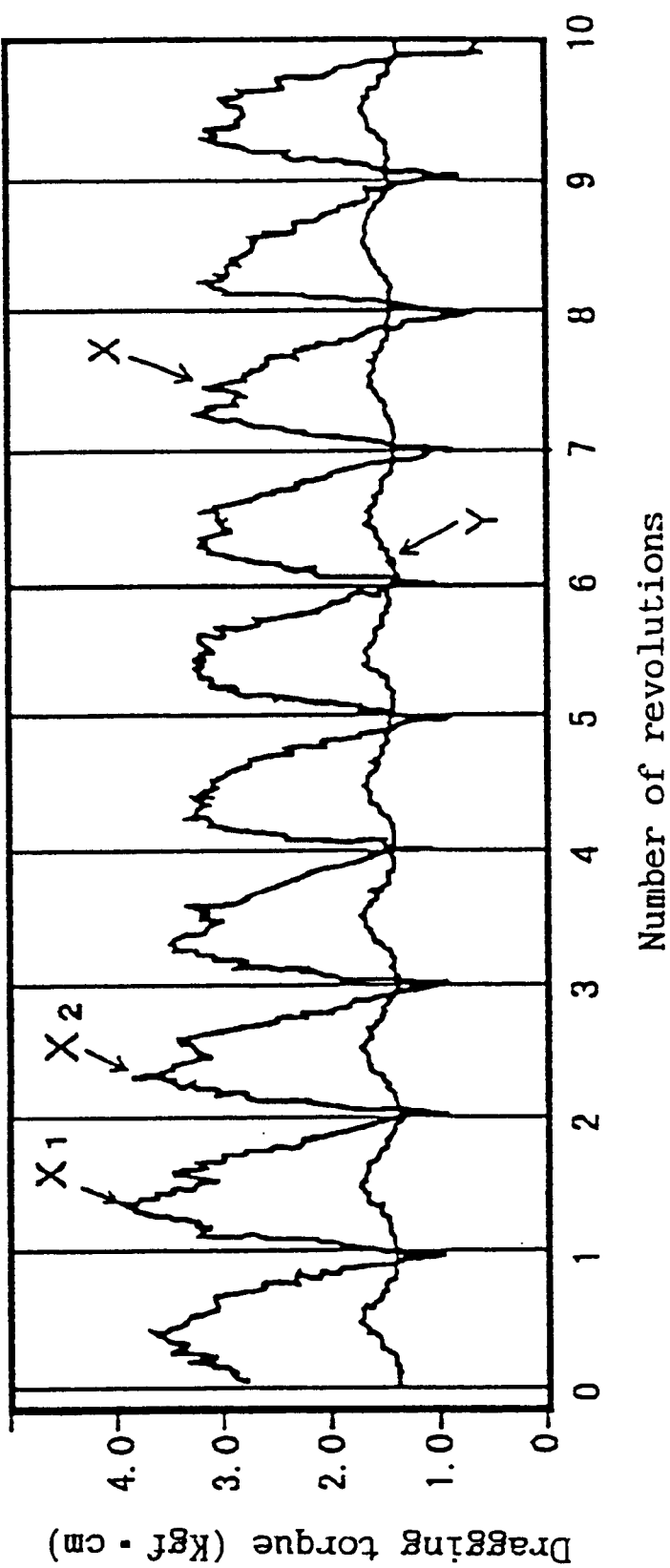
FIG. 6 is a graph comparing fluctuations in dragging torque in the arrangements of the present invention and the prior art.

Next, the dragging force produced in a disk brake of an RV is described. Suppose here that the disk rotor D of the disk brake shown in FIG. 1 has an effective braking radius r=130 mm, and a run-out to one side of 0.15 mm, and the friction pads have a friction coefficient $\mu$=0.35. FIG. 6 shows how the dragging force produced in this disk brake changes for each revolution of the disk rotor D when an input fluid pressure of 70 kgf/cm$^2$ is applied and then released.

Line X in FIG. 6 indicates fluctuations in dragging torque produced in a known opposed type disk brake. Line X was obtained by converting such torque fluctuations into electric signal level fluctuations using a load cell. The line X has peaks X1 and X2 exceeding 3.5 kgf.cm. Such peaks appear because even though the pistons should be retracted 0.2–0.3 mm by the retractor means, proper clearance is not formed between the pistons 4 and the back plates 6a of the pads 6 due to compression strain of the friction pads 6 and the deflection of the caliper 1, and thus the resistance to the piston retracting force is instantaneously applied to the pistons. Due to the presence of such peaks, the disk rotor D is periodically attacked by the pads and worn unevenly.

In the prior art, there is known a disk brake which is free of this problem. This brake has piston retracting means which can retract pistons a distance greater than the sum of the amount of deformation of each pad 6 due to compression strain and the amount of deflection of the caliper 1, and coupling means for coupling the pads 6 and the pistons 4 together. with this arrangement, when the pistons 4 retract, the pads 6 move with the pistons, separating from the disk rotor D. Thus, it is possible to prevent uneven wear of the disk rotor D. But this arrangement has its own problem in that earth, sand and muddy water tend to get into large gap formed between the disk rotor D and the pads 6 while the brake is not applied, thus quickening wear of the friction pads 6.

In order for the disk rotor D to maintain stable interfaces and to keep uneven wear of the disk to less than 15 $\mu$m, which is an upper limit of judder-free region, the dragging torque has to be kept under 3 kgf.cm even if the pads are made of a semimetallic material, which is known to severely attack the disk rotor. The above is clear from the graph of FIG. 6.

Line Y in FIG. 6 indicates fluctuations in dragging torque produced in an opposed type disk brake according to the present invention in which a resilient member is interposed between each friction pad 6 and the piston 4 to keep the pads 6 in frictional contact with the disk rotor D at a predetermined surface pressure. In this arrangement, the dragging force is kept low within a narrow range at around 2 kgf.cm. This is possible because even if the pads 6 are deformed due to compression strain and/or the caliper 1 is deflected, the pistons will reliably retract and separate from the back plates 6a of the pads 6 by the distance L as soon as the braking pressure is released. That is, while the brake is not applied, a gap is always present between each back plate and the end faces of the pistons 4. Thus, the pistons 4 will never be pushed back while the brake is not applied.

While the disk rotors D are usually made from gray cast iron equivalent to FC20, friction pads 6 are made from various materials. For example, most older pads were made of mainly asbestos fiber and hot-formed with addition of a phenol, a thermosetting resin. But because of its carcinogenicity, asbestos is rarely used in today's friction pads. Semimetallic pads, i.e. pads mainly made of metallic fiber, especially those containing ferrous metallic fiber, are also not preferred now, because such pads tend to rust and also severely attack the disk rotor. Now, non-asbestos friction pads in which asbestos fiber in older pads is replaced with aramide (aromatic polyamide) fiber are most popular.

Description is now made on how the amount of wear of the disk rotor is affected by the surface pressure applied to the disk rotor and the friction pads by the resilient members disposed between the pads and the pistons, and by the material of the pads. Asbestos, semimetallic and nonasbestos (each in two kinds) test pieces (having a pressed surface area of 3.125 cm$^2$) were pressed against a disk rotor D made of FC29 over the area defined by an effective braking radius r=96.5 mm at a surface pressure of 0.2–1.0 kgf/cm$^2$ under conditions equivalent to the conditions when a vehicle is driven at 130 km/h for 20 hours. The results of this test are shown in FIG. 7.

Figure 7:
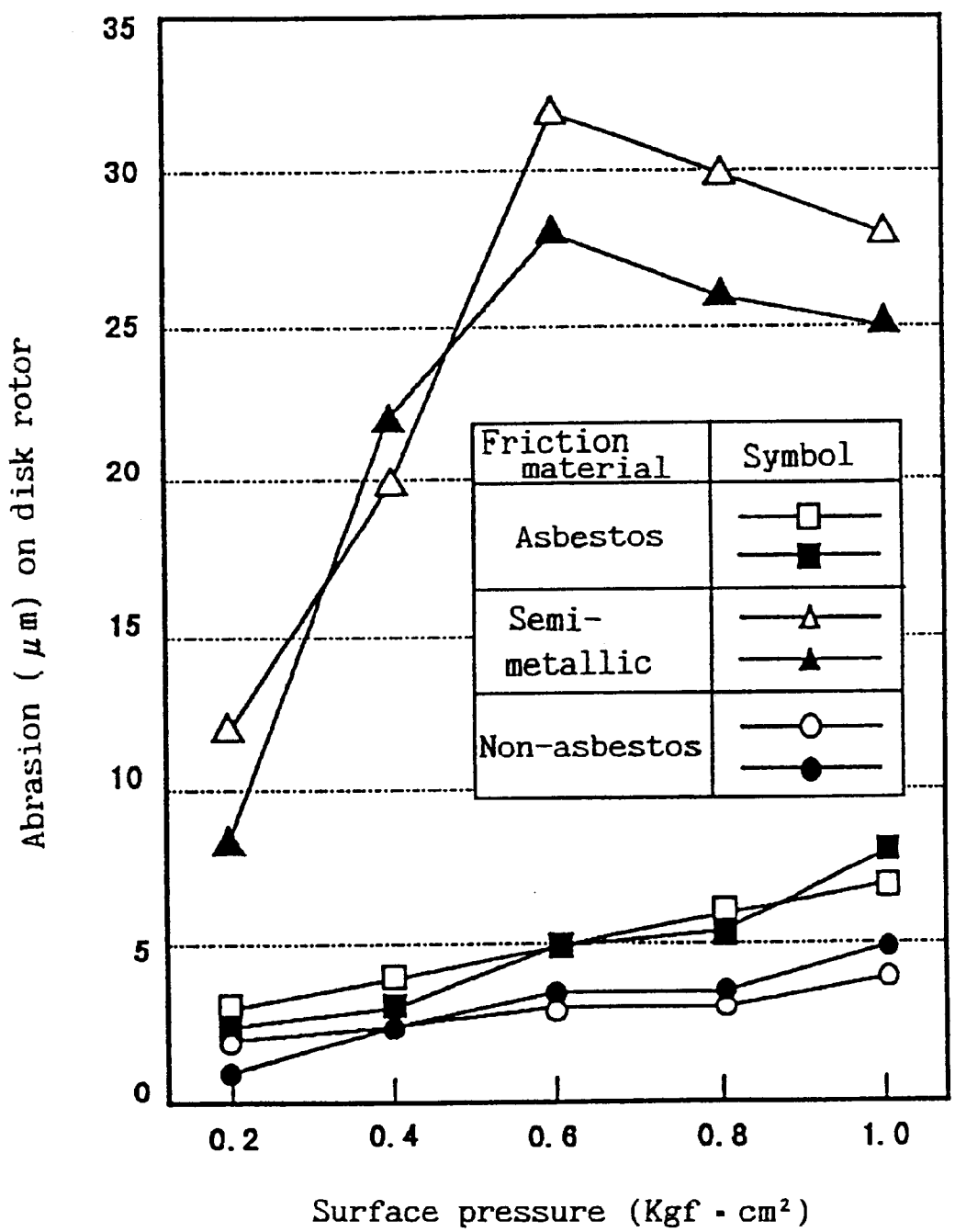
FIG. 7 is a graph comparing how friction members made of different materials attack a disk rotor.

In FIG. 7, the surface pressure of 1 kgf/cm$^2$ on the x-axis corresponds to 10 kgf.cm of dragging torque, though this rate depends on the material of the friction pads. According to the present invention, the dragging torque is set at a value not exceeding 3 kgf.cm, which corresponds to the surface pressure of 0.3 kgf/cm$^2$. Thus, as long as the friction pads are non-asbestos pads, the disk rotor will be abraded little.

In order to keep the dragging torque at a value not exceeding 3 kgf.cm, the resilient members have to be designed in the manner described below. Dragging torque T is given by the following equation:

$$T = 2\mu Pr$$

wherein $\mu$ is the friction coefficient of the friction pads; P is the pressure applied by the resilient members; and r is the effective braking radius of the disk rotor D If for semimetallic material $\mu$=0.35, P=0.1 kgf, and r=13 cm, then T=0.91 kgf.cm. Further, if the stroke L of the resilient member is 0.2 mm, and the spring constant k of the resilient members for absorbing the run-out of the disk rotor D is 0.5 kgf/mm, the mounting load P' of the resilient members when the stroke L is consumed will be 0.1 kgf. Thus, Tmax=$2\mu$(P+P')r will be 1.82 kgf.cm.

Even if the mounting load of the resilient member is 50% larger than the above value, Tmax is still 2.275 kgf.cm, which is well below 3 kgf.cm, the upper limit.

Specific embodiments of disk brakes according to the present invention are now described. The disk brakes of these embodiments are all of a type having one piston 4 on one side of the caliper 1.

FIRST EMBODIMENT

FIG. 2 is a sectional view of a first embodiment, in which a piston 4 slidably fits in a fluid pressure cylinder 2 formed in the caliper 1. A piston seal 5 seals around the piston 4 and serves to retract the piston 4 when the fluid pressure is released. A stretchable piston boot 11 is provided which has one end thereof engaged tightly in a boot groove 4a formed in the piston 4 and the other end in a clip groove 12 formed in the caliper 1 to prevent the entry of earth, sand and muddy water into the cylinder 2 through its open end. A shim 10 in the form of a flat plate is provided between the piston 4 and the friction pad 6 to bias the friction pad 6 against the disk rotor D at a predetermined surface pressure by a predetermined stroke.

The surface pressure is set by the flexibility of a plurality of tongues 10a formed by cutting and raising portions of the shim 10, while the stroke L is set by claws 10b provided on the shim 10 so as to straddle the back plate 6a of the friction pad 6. This arrangement is economically applicable to any known opposed type disk brake simply by changing the design of the shim 10.

SECOND EMBODIMENT

Figure 3:
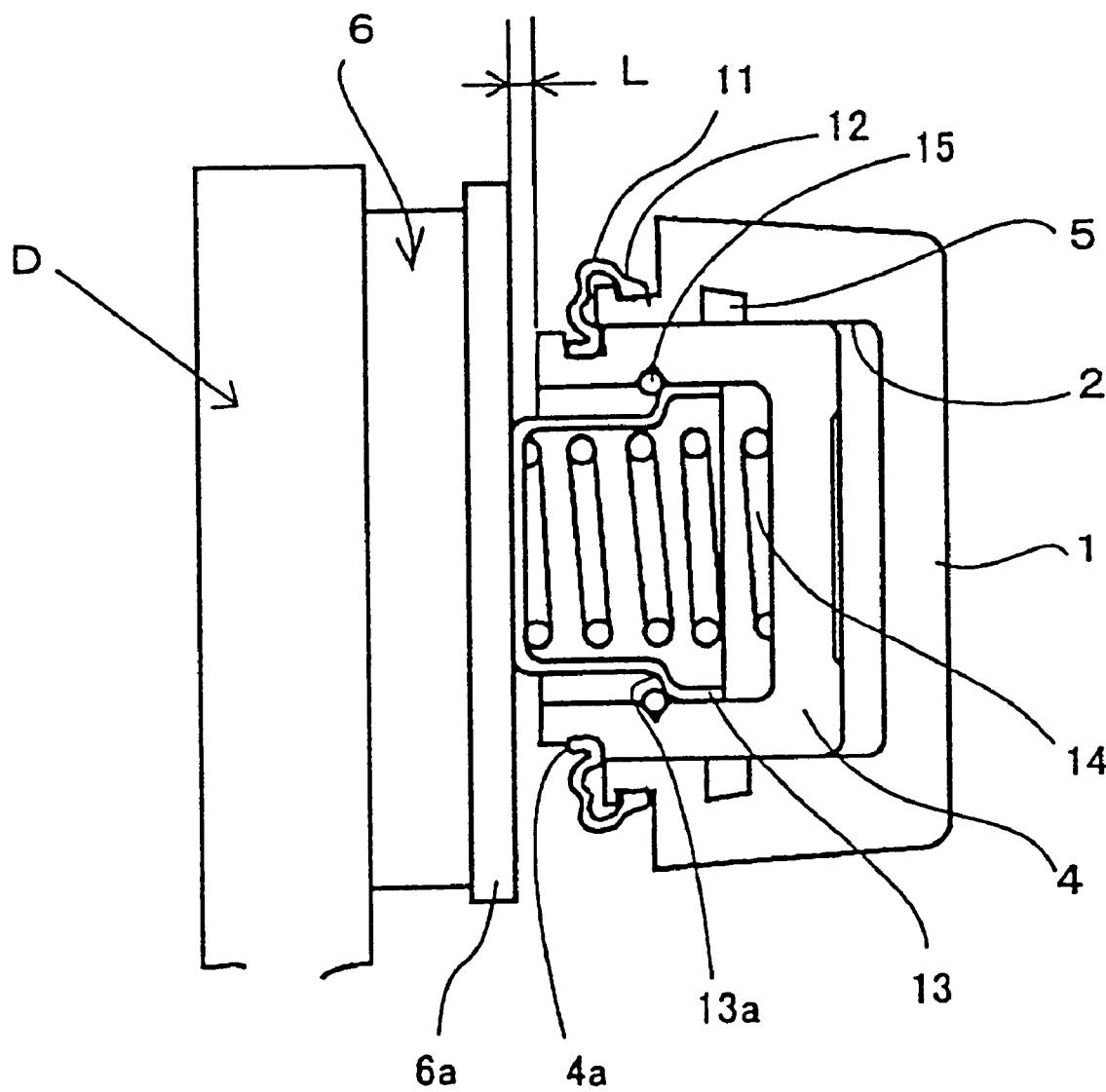
FIG. 3 is a sectional view of a resilient member of the second Embodiment.

FIG. 3 is a sectional view of a second embodiment, in which a deep-drawn cap 13 having a shoulder 13a is inserted in the piston 4 so as to be disposed between the piston 4 and the friction pad 6. A coil spring 14 is received in the cap 13. While not shown, a shim in the shape of a flat plate may be provided between the cap 13 and the friction pad 6 to suppress brake squeaks.

The surface pressure applied to the friction pad 6 is set by the mounting load of the coil spring 14, while the stroke L is determined by the position of a snap ring 15 fitted in a groove formed in the inner wall of the piston 4 and the position of the shoulder 13a. The resilient member of this embodiment is durable and easy to mount.

THIRD EMBODIMENT

Figure 4:
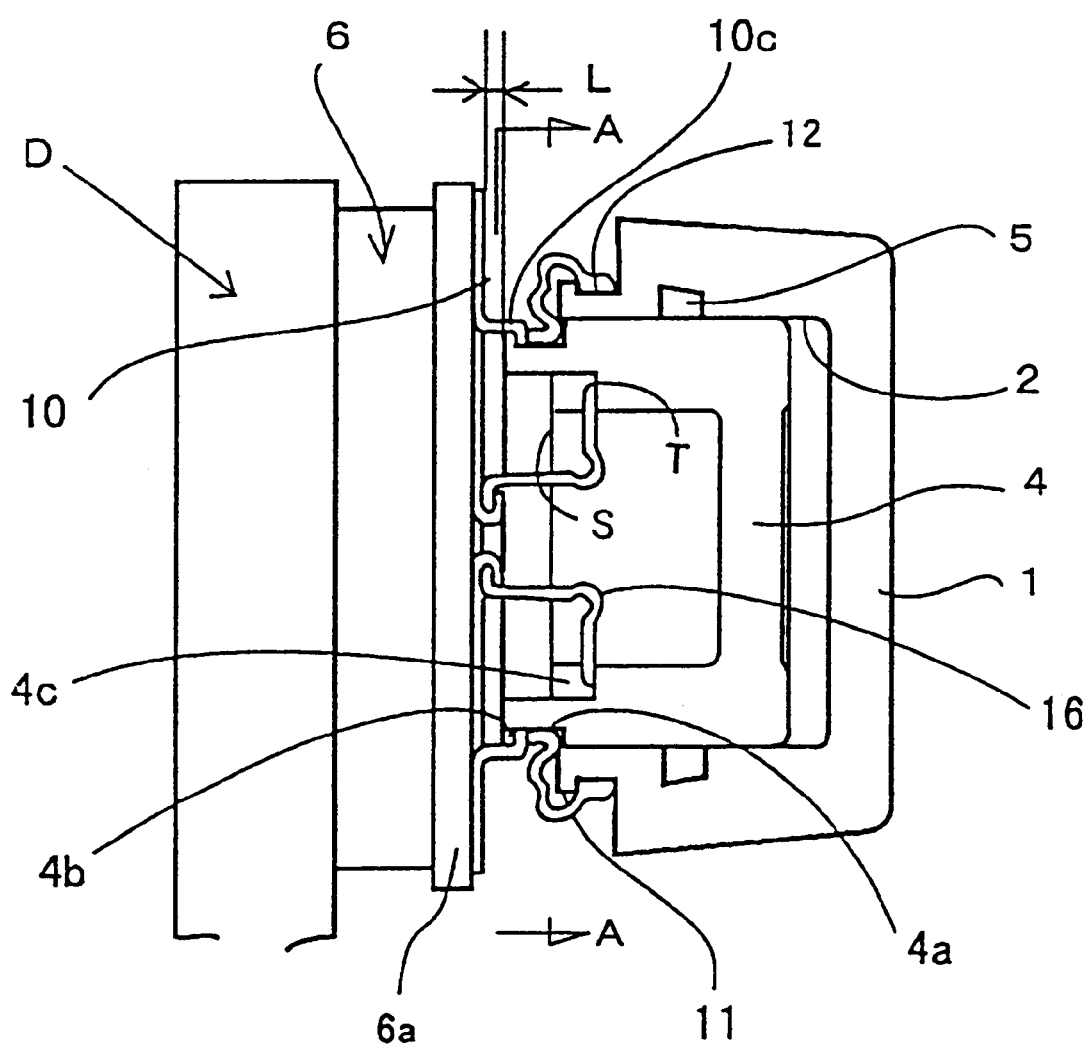
FIG. 4 is a sectional view of a resilient member of the third Embodiment.

FIG. 4 shows a section of a third embodiment, in which a member having a leaf spring 16 is provided between the piston 4 and the friction pad 6 through a shim 10 in the shape of a flat plate and engaged by a plurality of anchors 10c formed by cutting and raising portions of the shim 10. The surface pressure applied to the friction pad 6 is set by the flexibility of the leaf spring 16, while the stroke L is determined by the size of the anchors 10c.

Figure 5A:
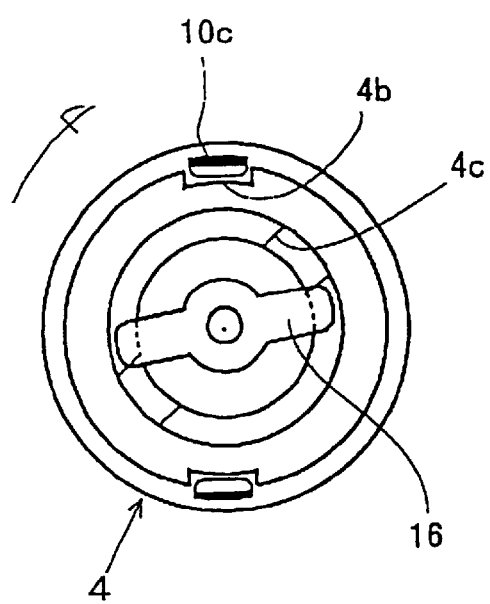
FIGS. 5A and 5B are sectional views taken along line A—A of FIG. 4 showing how the resilient member of FIG. 4 is mounted on the piston.
Figure 5B:
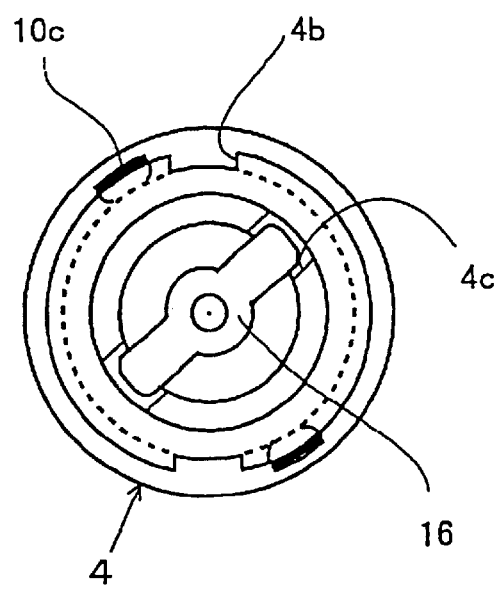

FIGS. 5A and 5B, which are sections taken along line A—A of FIG. 4, show how the shim 10 and the piston 4 are mounted. In the state of FIG. 5A, the anchors 10c pass anchor grooves 4b leading to boot grooves 4a formed in the piston 4, while the leaf spring 16 deflects to lines S (FIG. 4) on fixing grooves 4c provided offset from the anchor grooves 4b. In this state, the piston 4 is turned in the direction of arrow (FIG. 5A) to slide the leaf spring 16 until it is locked at line T in the grooves 4c. The resilient member of this embodiment is durable. The disk brake of this embodiment is made up of a small number of parts and easy to assemble.

The disk brakes of the embodiments are all opposed type disk brakes for use in RV's. But the concept of the present invention is equally applicable to floating type disk brakes, i.e. disk brakes having a fluid pressure cylinder or cylinders only on one side of the disk.

According to the present invention, the friction pads are always kept in frictional contact with the disk rotor at a predetermined surface pressure. Thus, it is possible to prevent earth, sand or muddy water from coming into the gap between the friction pads and the disk rotor even while the vehicle is traveling on a muddy or marshy ground. This makes it possible to stably maintain sufficient braking force and to prevent abnormal wear of the friction members. While the vehicle is traveling on a paved road, the friction pad biasing mechanism prevents uneven wear of the disk rotor, which is a leading cause of a judder of the disk brake.

What is claimed is:

1. A disk brake comprising a disk rotor, friction pads provided opposed to each other on both sides of said disk rotor and having a back plate, a caliper formed with a fluid pressure cylinder on at least one side of said disk rotor, a piston slidably received in said cylinder for applying braking force to said disk rotor by pushing said friction pads into frictional contact with said disk rotor, a piston retractor that retracts said piston when fluid pressure applied to said piston is released, and a resilient member disposed between said piston and said friction pads for biasing said friction pads toward said disk rotor by a predetermined stroke, thereby keeping said friction pads always in contact with said disk rotor over an entire frictional surface of said friction pads at a predetermined surface pressure even while the brake is not applied, said friction pads comprising substantially the sole source of braking force.

2. A disk brake as claimed in claim 1, wherein said resilient member comprises a shim in the shape of a flat plate having tongues extending from the plane of the flat of said shim, said shim having claws straddling said back plate of said friction pad, thereby determining the stroke of said tongues.

3. A disk brake as claimed in claim 1 wherein said resilient member is a coil spring having one end thereof engaged in a concave bottom of said piston and the other end fitted in a cap slidably inserted in said piston, and wherein the stroke of said coil spring is determined by the position of a snap ring received in a groove formed in the inner periphery of said piston and the position of a shoulder portion formed on the outer periphery of said cap.

4. A disk brake as claimed in claim 1 wherein said resilient member is a member having a leaf spring, and wherein the stroke of said leaf spring is determined by engaging anchors formed by cutting and raising portions of a shim in the shape of a flat plate disposed between said piston and said friction pad, said anchors being engaged in a piston boot groove formed in said piston.

5. The disk brake according to claim 1, a contact surface of said disk rotor when fluid is applied to said piston being equal to a contact area of said disk rotor when fluid pressure is released.

6. A disk brake comprising a disk rotor, at least one friction pad provided on at least one side of said disk rotor, said at least one friction pad having a back plate, a fluid pressure cylinder, a piston slidably received in said fluid pressure cylinder, said piston applying a braking force to said disk rotor by pushing said at least one friction pad into frictional contact with said disk rotor, and a resilient member positioned between said piston and said at least one friction pad, said resilient member biasing said at least one friction pad toward said disk rotor by a predetermined stroke, thereby keeping said at least one friction pad in contact with said disk rotor at a predetermined surface pressure even while said brake is not applied, a surface area of said disk rotor contacted when said piston pushes said at least one friction pad into frictional contact with said disk rotor and when said piston does-not push at least one said frictional pad into frictional contact with said disk rotor being substantially equal, said at least one friction pad comprising substantially the sole source of braking force.

7. The disk brake as claimed in claim 6, said at least one friction pad comprising friction pads provided opposite to each other on each side of said disk rotor.

8. The disk brake according to claim 6, further comprising a piston retractor that retracts said piston when fluid pressure applied to said piston is released.

9. The disk brake according to claim 6, said resilient member comprising a shim in the shape of a flat plate having tongues extending from the plane of said flat plate, said shim having claws straddling a back plate of said friction pad, thereby determining the stroke of said tongues.

10. The disk brake according to claim 6, said resilient member comprising a coil spring having one end engaged in a concave bottom of said piston and an other end fitted in a cap positioned within said piston, wherein the stroke of said coil spring is determined by a position of a snap ring received in a groove formed in an inner periphery of said piston and a position of a shoulder portion formed on an outer periphery of said cap.

11. The disk brake according to claim 6, said resilient member comprising a leaf spring, wherein the stroke of said leaf spring is determined by engaging end anchors formed by portions of a shim having a shape of a flat plate disposed between said piston and said friction pad, said anchors being engaged in a piston boot groove formed in said piston.

* * * * *

UNITED STATES PATENT AND TRADEMARK OFFICE
CERTIFICATE OF CORRECTION

PATENT NO.     : 6,308,807 B1                                                Page 1 of 1
DATED          : October 30, 2001
INVENTOR(S)    : A. Matsumoto et al.

It is certified that error appears in the above-identified patent and that said Letters Patent is hereby corrected as shown below:

<u>Title page,</u>
Item [73], Assignee, "Industrial" should be -- Industries --.

Signed and Sealed this

Twenty-fifth Day of June, 2002

Attest:

Attesting Officer

JAMES E. ROGAN
Director of the United States Patent and Trademark Office